US 8,754,971 B2

(12) United States Patent
Hashimoto

(10) Patent No.: US 8,754,971 B2
(45) Date of Patent: Jun. 17, 2014

(54) IMAGE SENSING APPARATUS AND IMAGE CAPTURING SYSTEM

(71) Applicant: Canon Kabushiki Kaisha, Tokyo (JP)

(72) Inventor: Seiji Hashimoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/889,394

(22) Filed: May 8, 2013

(65) Prior Publication Data

US 2013/0242153 A1 Sep. 19, 2013

Related U.S. Application Data

(63) Continuation of application No. 13/177,660, filed on Jul. 7, 2011, now Pat. No. 8,462,241, which is a continuation of application No. 12/047,852, filed on Mar. 13, 2008, now Pat. No. 8,009,211.

(30) Foreign Application Priority Data

Apr. 3, 2007 (JP) ................................ 2007-097630
Nov. 29, 2007 (JP) ................................ 2007-309334

(51) Int. Cl.
*H04N 5/335* (2011.01)

(52) U.S. Cl.
USPC .......................................... 348/294; 348/272

(58) Field of Classification Search
CPC ..... H04N 5/335; H04N 5/347; H04N 5/3458; H04N 2209/045; H04N 2209/046; H04N 9/045
See application file for complete search history.

(56) References Cited

U.S. PATENT DOCUMENTS

| 5,955,753 | A | 9/1999 | Takahashi |
| 6,124,888 | A | 9/2000 | Terada et al. |
| 6,686,960 | B2 | 2/2004 | Iizuka |
| 6,731,335 | B1 | 5/2004 | Kim et al. |
| 6,765,616 | B1 | 7/2004 | Nakano et al. |
| 6,992,714 | B1 | 1/2006 | Hashimoto et al. |

(Continued)

FOREIGN PATENT DOCUMENTS

| CN | 1292599 C | 12/2006 |
| JP | 9-046596 A | 2/1997 |

(Continued)

OTHER PUBLICATIONS

Jan. 8, 2010 Chinese Official Action in Chinese Patent Appln. No. 200810090081.3.

(Continued)

*Primary Examiner* — Luong T Nguyen
(74) *Attorney, Agent, or Firm* — Fitzpatrick, Cella, Harper & Scinto

(57) ABSTRACT

An image sensing apparatus includes a pixel unit which has an array of a plurality of groups each including a plurality of pixels arrayed in a row direction and a column direction, and an adding unit configured to add, of pixel signals output from the plurality of pixels arrayed in the groups, homochromatic pixel signals. The adding unit has, for each group, a common pixel amplifier commonly connected to homochromatic pixels. The adding unit adds the pixel signals of the homochromatic pixels in the gate portion of the common pixel amplifier so that the spatial centers of gravity of the pixels added in the group are arranged at equal pitches in at least one of the row direction and the column direction.

4 Claims, 15 Drawing Sheets

(56) References Cited

U.S. PATENT DOCUMENTS

| | | |
|---|---|---|
| 7,256,831 B2 | 8/2007 | Iizuka |
| 7,307,660 B2 | 12/2007 | Iizuka |
| 7,646,413 B2 | 1/2010 | Hashimoto |
| 7,760,959 B2 * | 7/2010 | Hashimoto .................. 382/254 |
| 2003/0020819 A1 | 1/2003 | Fukuda |
| 2003/0193585 A1* | 10/2003 | Ogura et al. ................. 348/272 |
| 2004/0141079 A1 | 7/2004 | Yamaguchi et al. |
| 2005/0012836 A1* | 1/2005 | Guidash ....................... 348/302 |
| 2005/0052552 A1 | 3/2005 | Hashimoto |
| 2005/0189472 A1 | 9/2005 | Asaba |
| 2006/0132634 A1 | 6/2006 | Kudoh |
| 2006/0203113 A1 | 9/2006 | Wada et al. |
| 2006/0256221 A1 | 11/2006 | McKee et al. |
| 2007/0120985 A1 | 5/2007 | Hashimoto |
| 2009/0053848 A1 | 2/2009 | Fan |

FOREIGN PATENT DOCUMENTS

| | | |
|---|---|---|
| JP | 11-234688 A | 8/1999 |
| JP | 2001-036920 A | 2/2001 |
| JP | 2001-292453 A | 10/2001 |
| JP | 2004-147094 A | 5/2004 |
| JP | 2004-266369 A | 9/2004 |
| JP | 2005-045435 A | 2/2005 |
| JP | 2005-086657 A | 3/2005 |
| JP | 2005-092085 A | 4/2005 |

OTHER PUBLICATIONS

Dec. 23, 2013 Chinese Official Action in Chinese Patent Appln. No. 201210074523.1.

* cited by examiner

FIG. 2

| G | B | G | B | ← ONE PIXEL |
|---|---|---|---|---|
| R | G | R | G | |
| G | B | G | B | |
| R | G | R | G | |

FOUR PIXELS TO BE ADDED

FIG. 11

| | | | | | | | | | | NINE PIXELS TO BE ADDED |
|---|---|---|---|---|---|---|---|---|---|---|
| | | | | | G1,10 | | G3,10 | | G5,10 | B6,10 | | B8,10 | | B10,10 |
| | | | | | | | | | | | | | | |
| | | | | | G1,8 | | G3,8 | | G5,8 | B6,8 | | B8,8 | | B10,8 |
| | | | | | | ↓ GROUP 3 | | | | | | | ↓ GROUP 4 | |
| | | | | | G1,6 | | G3,6 | | G5,6 | B6,6 | | B8,6 | | B10,6 |
| | R1,5 | | R3,5 | | R5,5 | G6,5 | | G8,5 | | G10,5 | | | | |
| | | | | | | | | | | | | | | |
| | R1,3 | | R3,3 | | R5,3 | G6,3 | | G8,3 | | G10,3 | | | | |
| ↓ GROUP 1 | | | | | | | ↓ GROUP 2 | | | | | | | |
| R1,1 | | R3,1 | | R5,1 | G6,1 | | G8,1 | | G10,1 | | | | | |

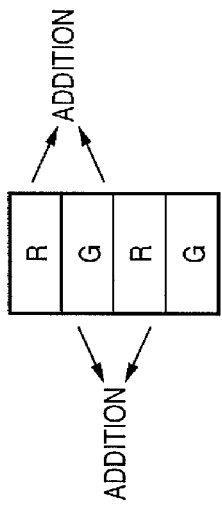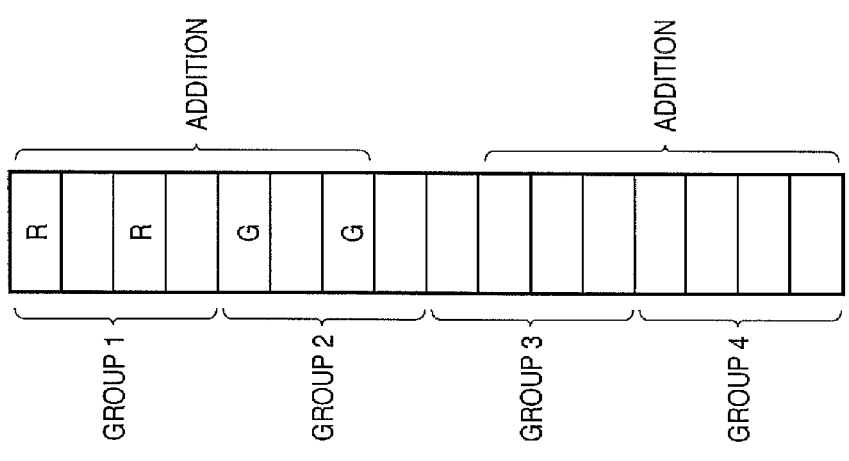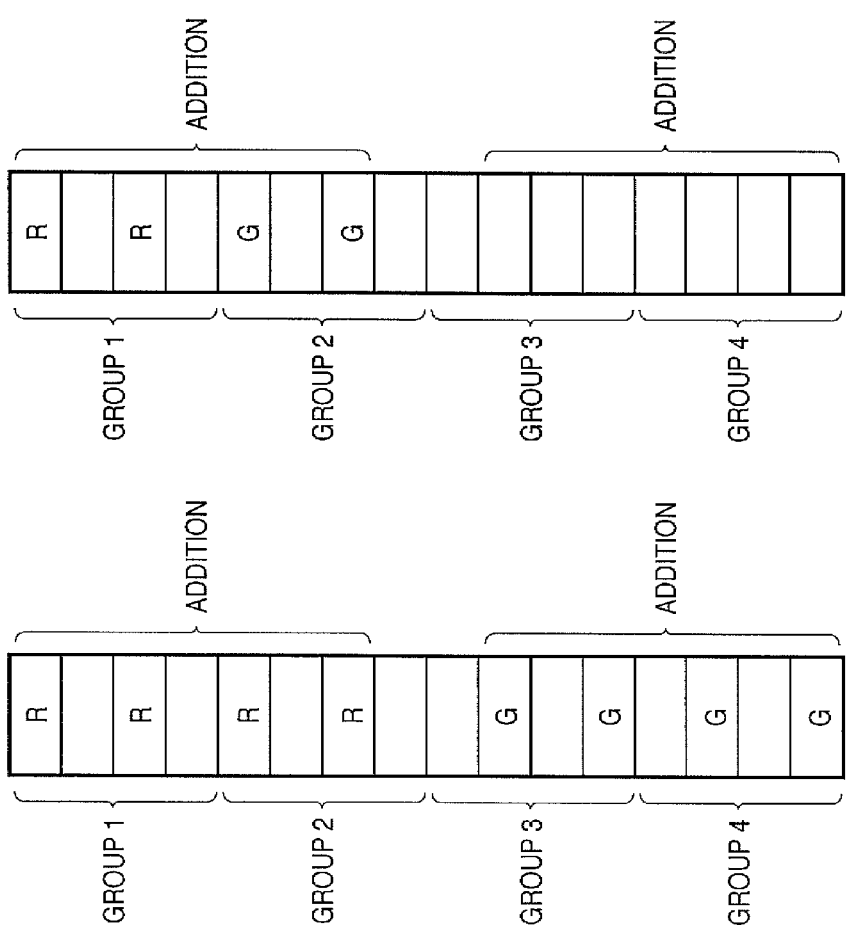

IMAGE SENSING APPARATUS AND IMAGE CAPTURING SYSTEM

This application is a continuation of application Ser. No. 13/177,660 filed Jul. 7, 2011, which is a continuation of application Ser. No. 12/047,852 filed Mar. 13, 2008, U.S. Pat. No. 8,009,211 B2.

BACKGROUND OF THE INVENTION

1. Field of the Invention

The present invention relates to an image sensing apparatus and an image capturing system which capture an object image.

2. Description of the Related Art

A recent digital still camera mainly aiming at still image shooting uses image capturing elements corresponding to more than 10,000,000 pixels. A movie camera mainly aiming at moving image shooting also uses image capturing elements corresponding to millions of pixels. For these application purposes, generally, high-resolution shooting that requires a high resolution is executed using a large number of pixels. If the resolution can be low, shooting is executed using a small number of pixels. In high-resolution shooting, signals are read out from almost all pixels of the image capturing elements. In low-resolution shooting, readout is done while performing pixel decimation driving or pixel signal addition, thereby preventing battery drain in the camera, increasing the number of shot images, and executing high-speed shooting for moving images (Japanese Patent Laid-Open Nos. 9-46596 and 2001-36920).

Japanese Patent Laid-Open No. 9-46596 discloses a technique of adding signals of different colors on a common pixel amplifier.

Japanese Patent Laid-Open No. 2001-36920 discloses a technique of adding homochromatic signals so that spatial color arrangement of the colors after addition matches that before addition in every block of 4×4 pixels.

The technique of Japanese Patent Laid-Open No. 9-46596 does not adopt homochromatic addition and cannot obtain the signals of the respective colors. It is therefore impossible to obtain a high-resolution image.

In Japanese Patent Laid-Open No. 2001-36920, since the spatial centers of gravity of the pixels after addition are not located at equal pitches, moiré is generated.

As described above, in the conventional techniques, it is very difficult to obtain a high-resolution image by addition processing.

SUMMARY OF THE INVENTION

The present invention has been made in consideration of the above-described problem, and provides an image sensing apparatus and an image capturing system which have downsized pixels and can obtain a high-resolution image by addition processing.

According to the first aspect of the present invention, there is provided an image sensing apparatus comprising: a pixel unit which has an array of a plurality of groups each including a plurality of pixels arrayed in a row direction and a column direction; and an adding unit configured to add, of pixel signals output from the plurality of pixels arrayed in the groups, homochromatic pixel signals, wherein the adding unit has, for each group, a common pixel amplifier commonly connected to homochromatic pixels and adds the pixel signals of the homochromatic pixels in a gate portion of the common pixel amplifier so that spatial centers of gravity of the pixels added in the group are arranged at equal pitches in at least one of the row direction and the column direction.

According to the second aspect of the present invention, there is provided an image capturing system comprising: the image sensing apparatus according to the first aspect of the present invention; an optical system configured to form an image of light in the image sensing apparatus; a recording system configured to record a signal output from the image sensing apparatus; and a system control circuit configured to control the entire system.

The present invention can provide an image sensing apparatus and an image capturing system which have downsized pixels and can obtain a high-resolution image by addition processing and decimation processing of pixel signals.

Further features of the present invention will become apparent from the following description of exemplary embodiments (with reference to the attached drawings).

BRIEF DESCRIPTION OF THE DRAWINGS

FIG. 2 is a view showing the arrangement of the colors of pixel units in an image sensing region in FIG. 1;

FIG. 11 is a view showing still another addition method according to the preferred embodiment of the present invention;

FIG. 15 is a view showing another addition method according to the preferred embodiment of the present invention;

FIG. 16 is a view showing still another addition method according to the preferred embodiment of the present invention;

FIG. 17 is a view showing still another addition method according to the preferred embodiment of the present invention;

DESCRIPTION OF THE EMBODIMENTS

The embodiments of the present invention will now be described in detail with reference to the accompanying drawings.

Figure 1:
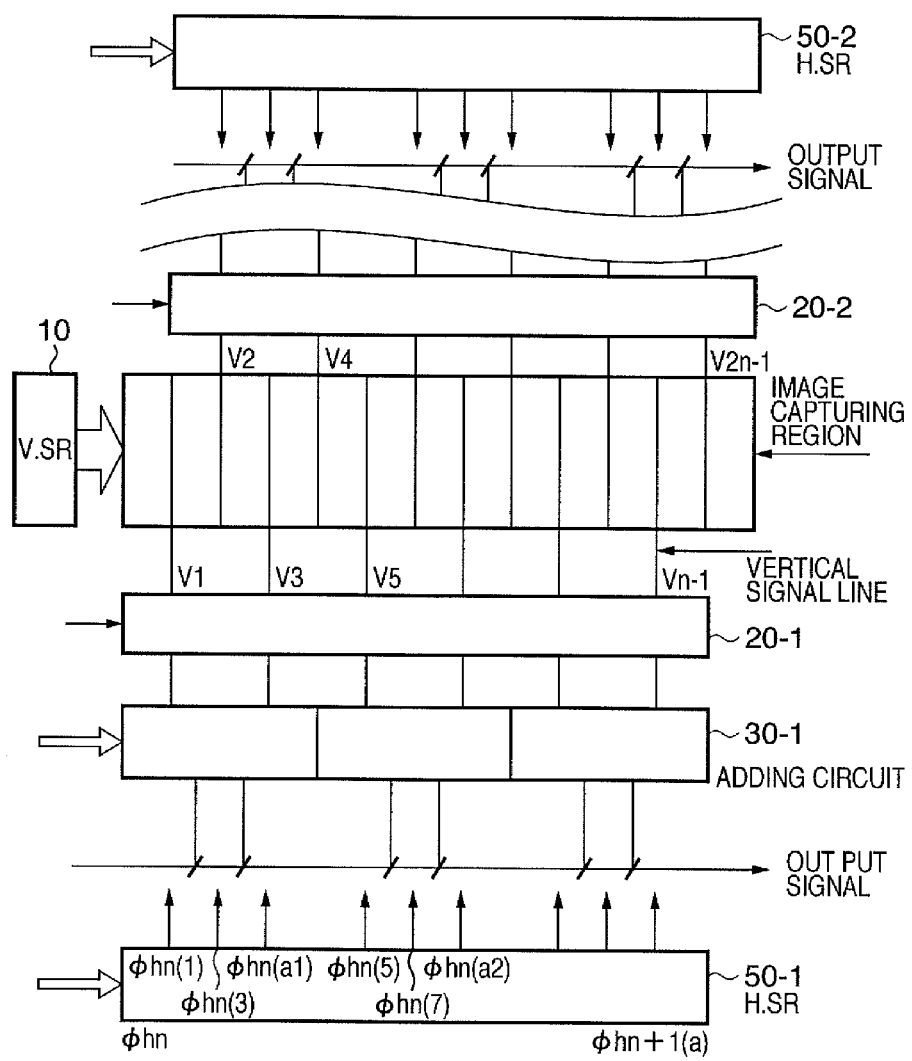
FIG. 1 is a block diagram of an image sensing apparatus according to a preferred embodiment of the present invention.

FIG. 1 is a block diagram of an image sensing apparatus according to a preferred embodiment of the present invention. Referring to FIG. 1, an image sensing region has a plurality of pixel units (also referred to as pixels) arrayed in the row and column directions, each of which includes a photodiode for photoelectric conversion and a pixel amplifier shown in FIGS. 3 and 4 to be described later. A driving pulse output from a vertical scanning circuit (V.SR) 10 controls the pixel units in the image sensing region. Odd-numbered vertical signal lines V2n−1 (n: integer, n≥1) in the image sensing region are connected to a readout circuit 20-1 including CDS circuits, amplification circuits, and memories. Even-numbered vertical signal lines V2n are connected to a readout circuit 20-2 including CDS circuits, amplification circuits, and memories. In the following description, signals R and G of odd-numbered columns (see FIG. 2) are sequentially transferred to circuits on the upper side of the image sensing region in FIG. 1. Signals G and B of even-numbered columns (see FIG. 2) are sequentially transferred to circuits on the lower side of the image sensing region. These circuits have identical arrangements. Only the circuits on the lower side of the image sensing region will be described herein, and a description of those on the upper side of the image sensing region will not be given.

The CDS circuits in the readout circuit 20-1 remove noise from signals (pixel signals) output from the pixel units in the image sensing region, and the amplification circuits amplify only the signal components. The signals are temporarily stored in the memories of the readout circuit 20-1. In this embodiment, a correction circuit (not shown) may be provided against offset variations between the amplification circuits. The image sensing apparatus that operates not in an adding readout mode but in a progressive scan mode will be described below. In this case, the signals stored in the memories of the readout circuit 20-1 are read out to output signal lines in accordance with scan pulses φhn (φhn(1), φhn(3), φhn(5), and φhn(7)) from a horizontal scanning circuit (H.SR). In the adding readout mode, the signals stored in the memories of the readout circuit 20-1 are guided to an adding circuit 30-1. The adding circuit 30-1 adds homochromatic pixel signals stored in the memories of the readout circuit 20-1. The pixel signals added by the adding circuit 30-1 are read out to the output signal lines in accordance with the scan pulses φhn (φhn(a1) and φhn(a2)) from the horizontal scanning circuit (H.SR).

Figure 2:
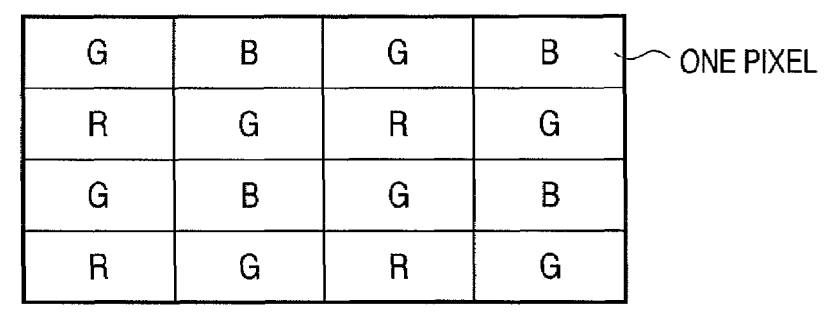

FIG. 2 is a view showing the arrangement of the colors of pixel units in the image sensing region in FIG. 1. Referring to FIG. 2, color filters G (green), R (red), and B (blue) are arranged on the photodiodes of the pixel units. In this example, G pixels are arranged in a checkered pattern, whereas R and B pixels are arranged line-sequentially. That is, 2×2=4 pixels corresponding to R, G, G, and B pixels are two-dimensionally arranged as a pixel color arrangement of one unit.

In the preferred embodiment of the present invention, some of the pixel units arranged in the image sensing region are periodically decimated and driven, and pixel signals output from the homochromatic pixel units in the image sensing region are added, thereby obtaining the homochromatic arrangement as in FIG. 2. The added pixel signals are stored in the memories and then read out from the image sensing region. These operations are sometimes executed in combination of decimation driving and pixel signal addition outside the image sensing region.

Figure 3:
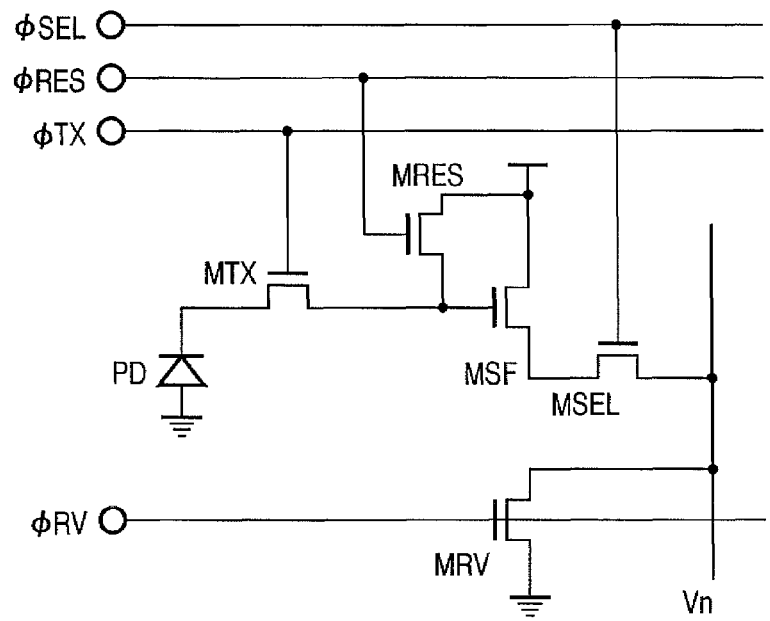
FIG. 3 is a view showing an example of the arrangement of a pixel unit in the image sensing region according to the preferred embodiment of the present invention.
Figure 4:
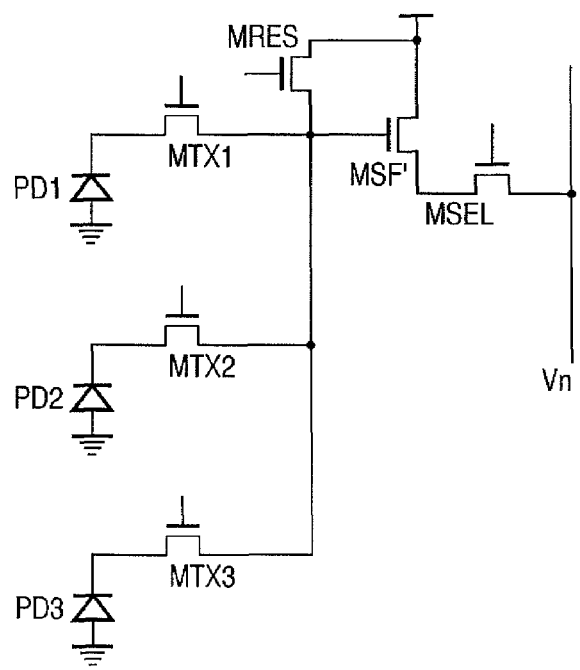
FIG. 4 is a view showing another example of the arrangement of a pixel unit in the image sensing region according to the preferred embodiment of the present invention.

FIGS. 3 and 4 are views showing examples of the arrangement of a pixel unit in the image sensing region according to the preferred embodiment of the present invention. FIG. 3 shows an example of a unit pixel amplifier including a photodiode PD corresponding to a pixel unit, and a pixel amplifier MSF which amplifies a signal from the photodiode PD. FIG. 4 shows an example of a common pixel amplifier including three photodiodes PD1, PD2, and PD3 and a common pixel amplifier MSFT. The three photodiodes PD1, PD2, and PD3 in FIG. 3 are arranged adjacently in the column direction.

The pixel unit shown in FIG. 3 includes the photodiode PD, a transfer switch MTX, a reset switch MRES, and a select switch MSEL. The photodiode PD functions as a photoelectric conversion unit which converts light into signal charges. The transfer switch MTX transfers signal charges stored in the photodiode PD to the gate portion (floating diffusion) of the pixel amplifier MSF. The reset switch MRES resets residual charges in the gate portion (input terminal) of the pixel amplifier MSF. The select switch MSEL transfers the reset signal after reset or the pixel signal from the photodiode PD from the pixel amplifier MSF to a vertical signal line Vn. A current source switch MRV of the pixel amplifier is provided outside the image sensing region.

When decimation driving is executed in the pixel arrangement in FIG. 3, no pixel signals are read out from pixels to be decimated. Addition driving is executed outside the pixel region.

In the pixel unit shown in FIG. 4, the photodiodes PD1, PD2, and PD3 and transfer switches MTX1, MTX2, and MTX3 which control transfer of signal charges from the photodiodes to the gate portion of the common pixel amplifier MSF' are commonly connected to the gate portion of the common pixel amplifier MSF'. When a plurality of photodiodes are arranged for one pixel amplifier, the area of the pixel amplifier with respect to one photodiode decreases, and consequently, the opening ratio of the photodiode increases.

It should be noted that, although the common pixel amplifier shown in FIG. 4 includes three photodiodes and one pixel amplifier, the present invention is not limited to this, and the common pixel amplifier may be connected in correspondence with 2n+1 (1≤n) photodiodes (groups). Alternatively, the common pixel amplifier may be connected in correspondence with 2n (1≤n) photodiodes (groups).

Figure 5:
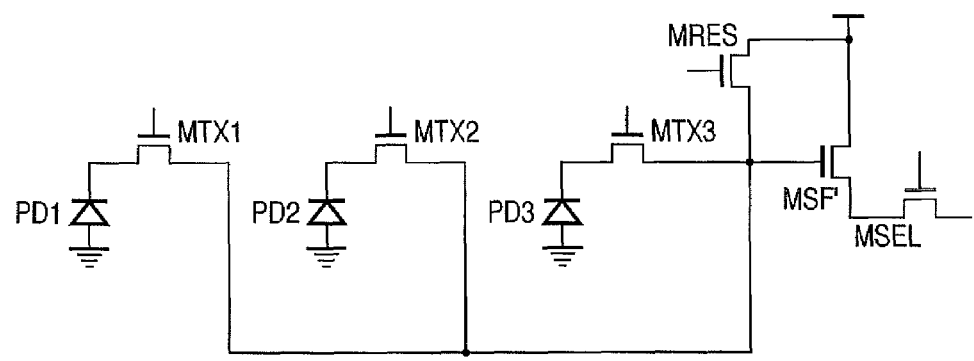
FIG. 5 is a view showing still another example of the arrangement of a pixel unit in the image sensing region according to the preferred embodiment of the present invention.

When decimation driving is executed in the pixel arrangement in FIG. 4, no charges are read out from pixels to be decimated. In addition driving, charges from corresponding pixels are transferred to the gate portion and added. More specifically, in the adding mode, one of the transfer switches MTX1, MTX2, and MTX3 is turned on to transfer signal charges from a corresponding one of the photodiodes PD1, PD2, and PD3 to the gate portion of the common pixel amplifier MSF', thereby performing addition. For a high-resolution image, the reset switch MRES and the transfer switches MTX1, MTX2, and MTX3 are alternately turned on to individually read out signal charges. Addition of signal charges from the photodiodes by the common pixel amplifier MSF' can be enabled/disabled by ON/OFF-controlling the transfer switches MTX1, MTX2, and MTX3 in this way. The common pixel amplifier of the embodiment shown in FIG. 4 is formed by commonly connecting the pixels in the vertical direction. However, the common pixel amplifier may be formed by commonly connecting the pixels in the horizontal direction (the row direction), as shown in FIG. 5.

Examples of decimation driving and addition driving according to the preferred embodiment of the present invention will be described next with reference to FIGS. 6 to 12. In FIGS. 6 to 12, a blank cell represents decimated pixel, and a cell indicated by a color symbol (R, G, B) represents an added pixel. In FIGS. 6 to 12, addition processing is performed using the common pixel amplifier MSF' commonly connected to a plurality of photodiodes, as shown in FIG. 4 or 5.

Figures 6, 7, 8:
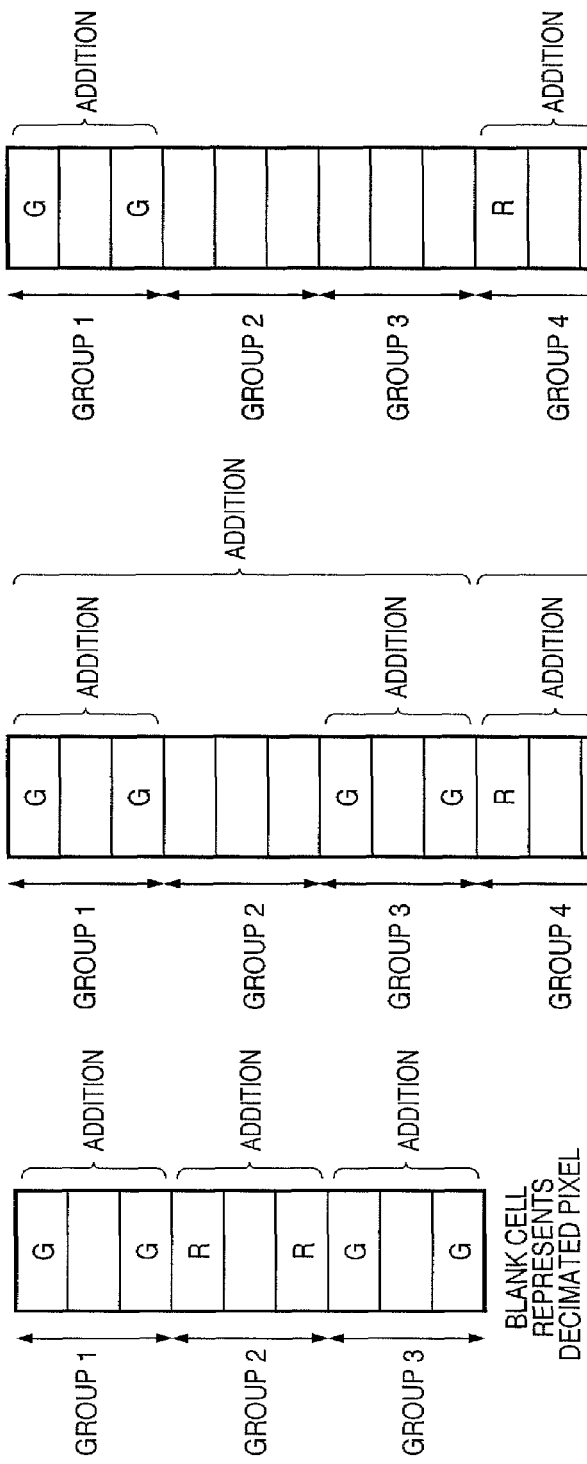
FIG. 6 is a view showing an addition method according to the preferred embodiment of the present invention.
FIG. 7 is a view showing another addition method according to the preferred embodiment of the present invention.
FIG. 8 is a view showing still another addition method according to the preferred embodiment of the present invention.

In FIG. 6, three pixels of three rows form a group, and one pixel (row) of them is decimated. This shortens the row driving time to ⅔. In addition driving, the common pixel amplifier MSF' adds two G signals of group 1, and also adds two R signals of group 2. The common pixel amplifier MSF' adds charges of two pixels in the pixel, and one pixel (row) is decimated. This shortens the row driving time to about ⅓. Since addition is done in the pixel, noise after the common pixel amplifier MSF' can be reduced. Additionally, the spatial centers of gravity (spatial pixel pitches) of the added signals (pixel signals) of the respective colors are located at equal pitches in the row direction. This prevents moiré from generating.

In FIG. 7, blocks of groups each including a plurality of pixels undergo decimation driving, in addition to the method shown in FIG. 6. More specifically, group 2 is decimated, and the common pixel amplifier MSF' adds charges in each of groups 1 and 3. Then, the adding circuit 30-1 in FIG. 1 adds groups 1 and 3. This decreases the driving period to ½ and increases the sensitivity to double, as compared to the method shown in FIG. 6.

In FIG. 8, groups 2 and 3 are decimated, and the common pixel amplifier MSF' connected to each of groups 1 and 4 executes addition. This further shortens the driving time to ⅓, as compared to the method shown in FIG. 6.

Figure 9:
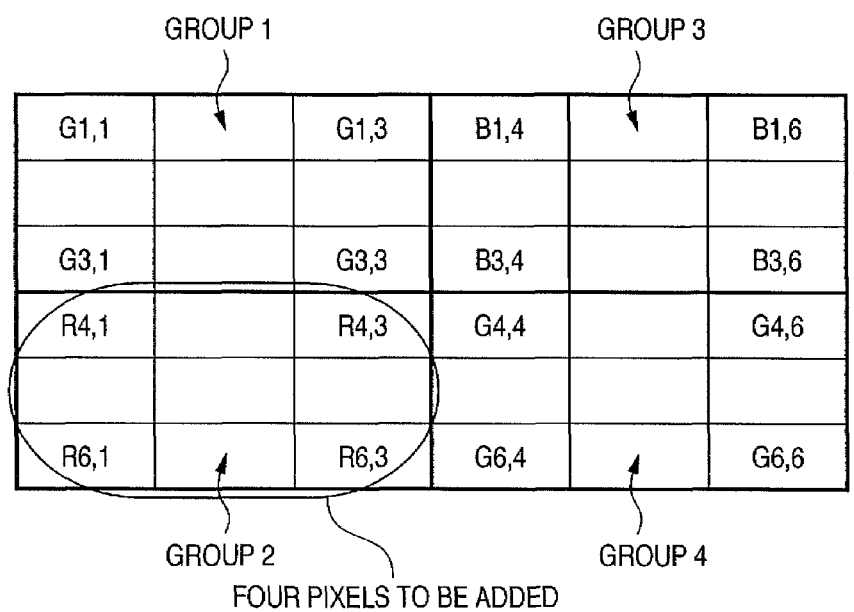
FIG. 9 is a view showing still another addition method according to the preferred embodiment of the present invention.

In FIG. 9, nine pixels of three rows×three columns form a group, and four homochromatic pixels in each group are added. More specifically, the common pixel amplifier MSF' connected to G1,1, G1,3, G3,1, and G3,3 in group 1 adds the pixel signals of these pixels. As a result, the four pixels are added. Similarly, the common pixel amplifier MSF' connected to R4,1, R4,3, R6,1, and R6,3 in group 2, or the adding circuit 30-1 adds the pixel signals of the four pixels. In remaining groups 3 and 4 as well, the pixel signals of four pixels are added in the same way. In this manner, decimation driving is executed in the vertical and horizontal directions of the pixels, and four pixels are added. This increases the sensitivity to double, as compared to the addition method shown in FIG. 6.

Figure 10:
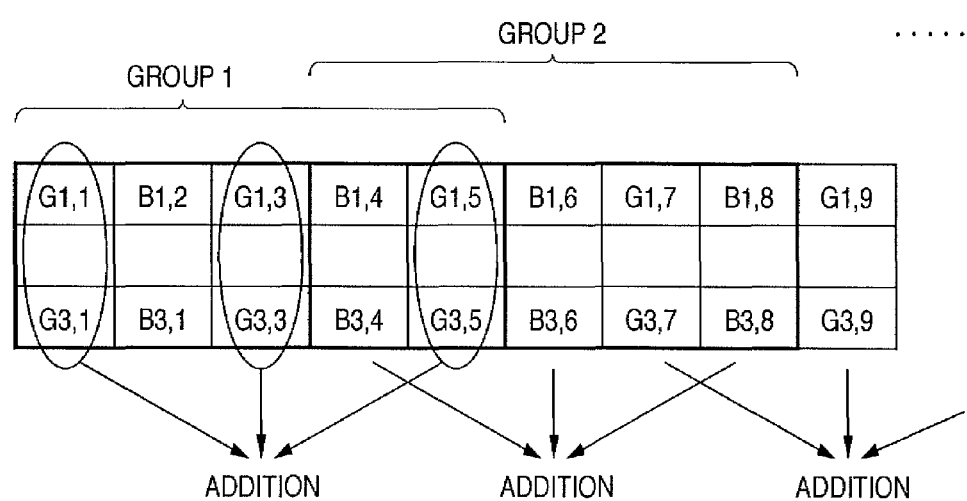
FIG. 10 is a view showing still another addition method according to the preferred embodiment of the present invention.

In FIG. 10, three rows×five columns form a group. The intermediate row in each group is decimated, and horizontal pixels which spatially overlap are added. More specifically, the common pixel amplifier MSF' connected to G1,1, G1,3, G1,5, G3,1, G3,3, and G3,5 in group 1, or the like adds the pixel signals of these pixels. As a result, the six pixels are added. Similarly, the common pixel amplifier MSF' connected to B1,4, B1,6, B1,8, B3,4, B3,6, and B3,8 in group 2, or the like adds the pixel signals of the six pixels. In the remaining groups as well, the pixel signals of six pixels are added in the same way. In this embodiment, since decimation driving in the horizontal direction is not executed, the sensitivity can be further increased. Additionally, since the number of readout pixels in the horizontal direction is reduced by addition, the driving time can further shorten.

In FIG. 11, 25 pixels of five rows×five columns form a group and the common pixel amplifier MSF' adds the pixel signals of nine homochromatic pixels in each group. More specifically, the common pixel amplifier MSF' connected to R1,1, R1,3, R1,5, R3,1, R3,3, R3,5, R5,1, R5,3, and R5,5 in group 1 adds the pixel signals of these pixels. As a result, the nine pixels are added. Similarly, the common pixel amplifier MSF' connected to G6,1, G6,3, G6,5, G8,1, G8,3, G8,5, G10, 1, G10,3, and G10,5 in group 2 adds the pixel signals of these pixels. As a result, the nine pixels are added. In the remaining groups as well, the pixel signals of nine pixels are added in the same way. In this embodiment, two pixels (rows) are decimated for every five pixels, and nine pixel signals are added. The common pixel amplifier MSF' of five pixels can shorten the pixel row driving time to about ⅕.

Figure 12:
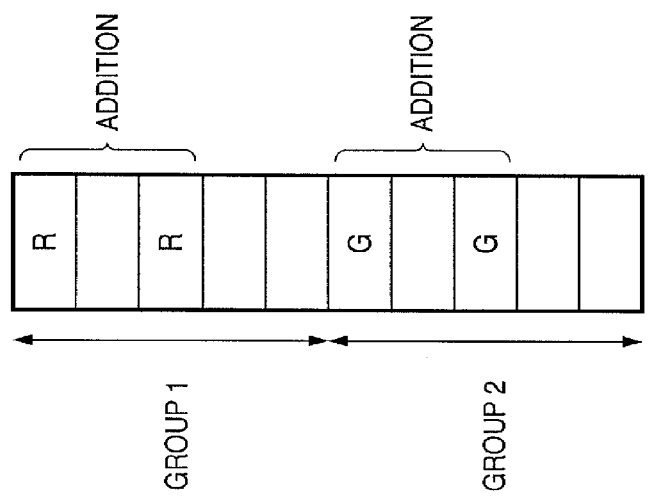
FIG. 12 is a view showing still another addition method according to the preferred embodiment of the present invention.

In FIG. 12, 25 pixels of five rows×five columns form a group, as shown in FIG. 11. The common pixel amplifier MSF' adds only the pixel signals of two homochromatic pixels (rows) in each group. This further shortens the driving time, as compared to the method shown in FIG. 11.

Figure 13:
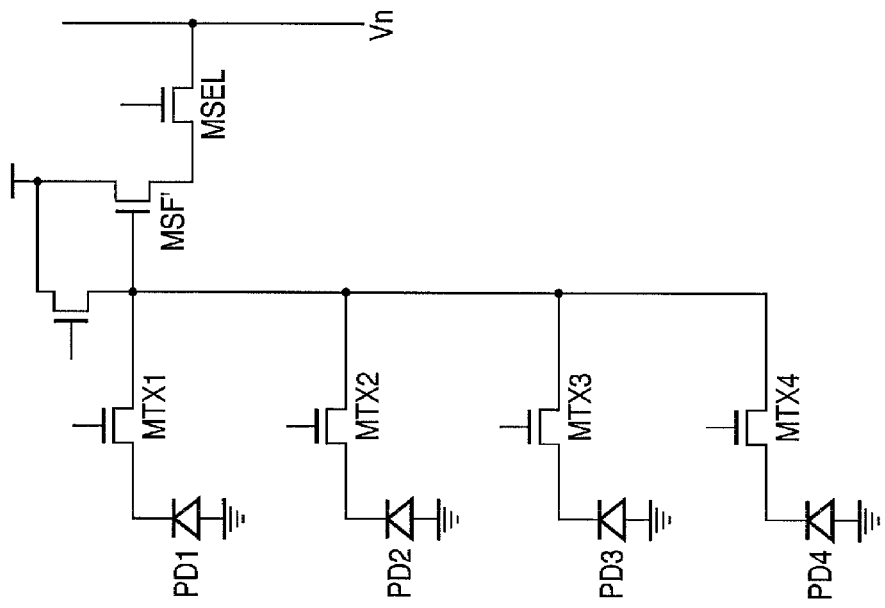
FIG. 13 is a view showing another example of the arrangement of a pixel unit in the image sensing region according to the preferred embodiment of the present invention.

In the above-described examples, the pixel unit has an odd number of photodiodes in the common pixel amplifier. Another example using an even number of photodiodes will be described next. In the pixel unit shown in FIG. 13, four photodiodes PD1 to PD4 are provided for one common pixel amplifier, unlike the example in FIG. 4 in which three photodiodes are provided for one common pixel amplifier. The fourth photodiode is PD4. A transfer switch which controls transfer to the gate portion of the common pixel amplifier MSF' is MTX4.

The basic operation of the pixel unit is the same as in the example shown in FIG. 4, and a description thereof will not be repeated. When four photodiodes are arranged for one common pixel amplifier, the area of the pixel amplifier with respect to one photodiode decreases, as compared to FIG. 4, and consequently, the opening ratio of the photodiode increases. The number of photodiodes is properly set in accordance with the system requirement (e.g., sensitivity, number of pixels, and signal readout speed) of the image sensing apparatus.

Figure 14:
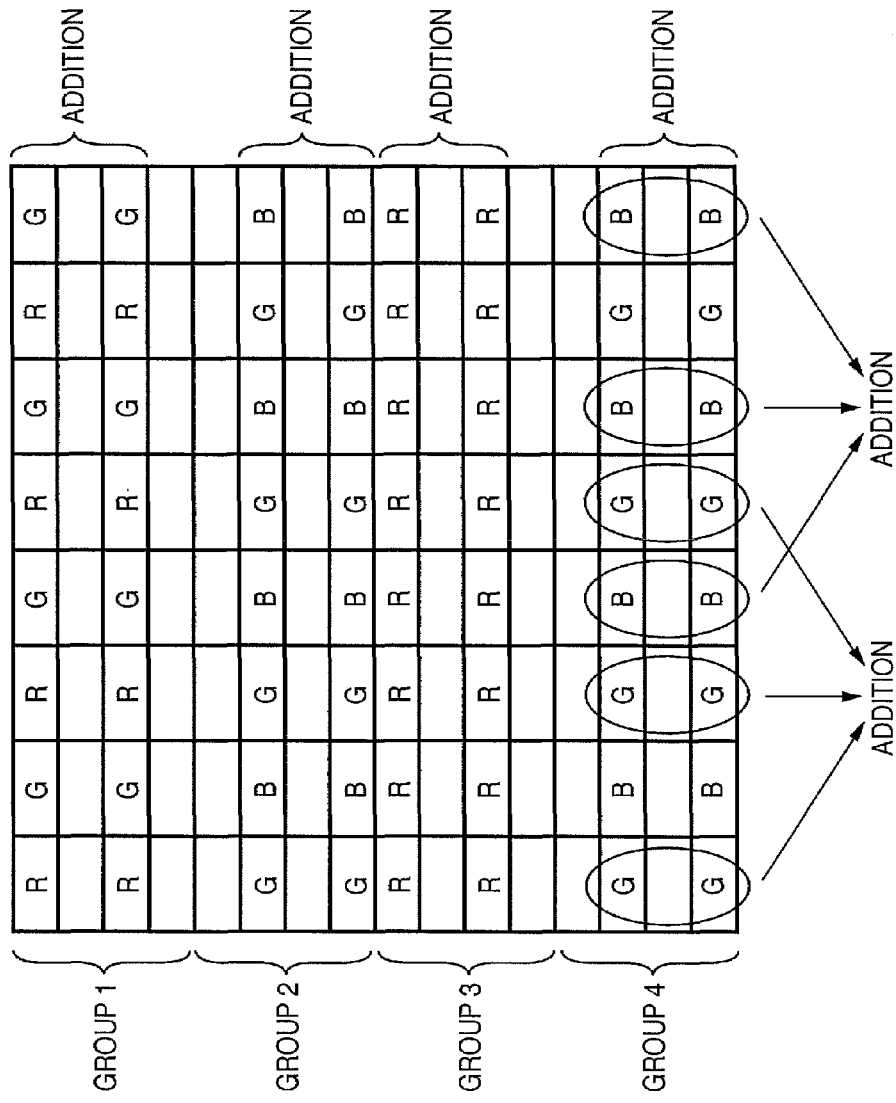
FIG. 14 is a view showing an addition method according to the preferred embodiment of the present invention.

In FIG. 14, four rows×five columns form a group. Vertical pixels of two homochromatic rows in each group, which are connected to the common pixel amplifier, are driven and added. Next, the sum signals which spatially overlap in the horizontal direction are added. The addition processing will be described in association with group 4 in FIG. 14. Two homochromatic signals in four photodiodes connected to one common pixel amplifier are added on the gate portion of the common pixel amplifier. The adding circuit 30-1 further adds the sum signals in three homochromatic columns. As a result, two vertical pixels and three horizontal pixels, that is, a total of six pixels are added. In the remaining groups as well, the pixel signals of six pixels are added in the same way. In this embodiment, since decimation driving in the horizontal direction is not executed, no pixels are wasted in the horizontal direction. The pixel addition in the common pixel amplifier shortens the time of vertical signal readout from the pixel amplifier to about ¼. The signal addition also shortens the time of horizontal signal readout to about ⅓.

Pixel addition of three columns in the horizontal direction may use another addition ratio. For example, when, of three columns, the addition ratio between the central pixels and the end pixels is set to 2:1, the sensitivity ratio of pixels that overlap between groups decreases. This consequently increases the resolution.

FIGS. 15, 16, and 17 show other examples of the addition method. FIGS. 15 to 17 do not illustrate addition in the horizontal direction.

In FIG. 15, adjacent groups in the vertical direction undergo addition driving. As a result, the signal readout time in the vertical direction shortens to about ¼, as compared to progressive scan. Additionally, since addition of homochromatic signals increases, the sensitivity increases.

FIG. 16 shows an example in which decimation driving of groups is executed in the vertical direction. The signal readout time in the vertical direction shortens to ½, as compared to the example shown in FIG. 15.

FIG. 17 shows an example in which one common pixel amplifier adds signals of each of two colors. In this example, first, the common pixel amplifier adds and reads out R signals. After that, the common pixel amplifier adds and reads out G signals. The addition by the common pixel amplifier shortens the signal readout time in the vertical direction to ½.

As described above, when four photodiodes are provided for one common pixel amplifier, the common pixel amplifier can process sum signals of two colors. In a 3-photodiode type, the adding circuit 30-1 must execute addition processing in the row direction. However, this prevents any increase in noise caused by addition processing in the pixel amplifier.

In the 4-photodiode type of the above-described examples, the spatial centers of gravity of sum pixels in the row direction are not located at equal pitches. In the example shown in FIG. 13, sum signals preferably have a spatial pitch corresponding to four pixels. However, the spatial center of gravity shifts by one pixel in the sum signals of an even number of photodiode groups, as compared to an odd number of photodiode groups. When the spatial shift is corrected by causing a signal processing circuit (to be described later) to process the signals of the even number of groups while changing the weighting in the row direction, the moiré can be reduced.

The object of the present invention is to add or decimate a plurality of pixel signals in a common pixel amplifier and further add the pixel signals in or between the groups of pixel units, thereby improving the pixel signal readout driving frequency or sensitivity. Alternatively, groups each including 2n+1 pixel rows or pixel columns are formed, and the pixel rows or pixel columns are decimated or added in or between the groups. It is only necessary to arrange the spatial pitches (spatial centers of gravity) of the pixels of the respective colors at equal pitches at least in the row direction or column direction. Hence, if this can be implemented, the present invention is not limited to the above-described methods, and any other methods are applicable. The order of group addition and the number of groups in the embodiment are merely examples, and the present invention is not limited to those.

The object of the present invention is to form groups each including 2n+1 pixel rows or pixel columns and decimate or add the pixel rows or pixel columns in or between the groups, thereby improving the pixel signal readout driving frequency or sensitivity. It is only necessary to arrange the spatial pitches (spatial centers of gravity) of the pixels of the respective colors at equal pitches at least in the row direction or column direction. Hence, if this can be implemented, the present invention is not limited to the above-described methods, and any other methods are applicable. The order of group addition and the number of groups in the embodiment are merely examples, and the present invention is not limited to those.

Figure 18:
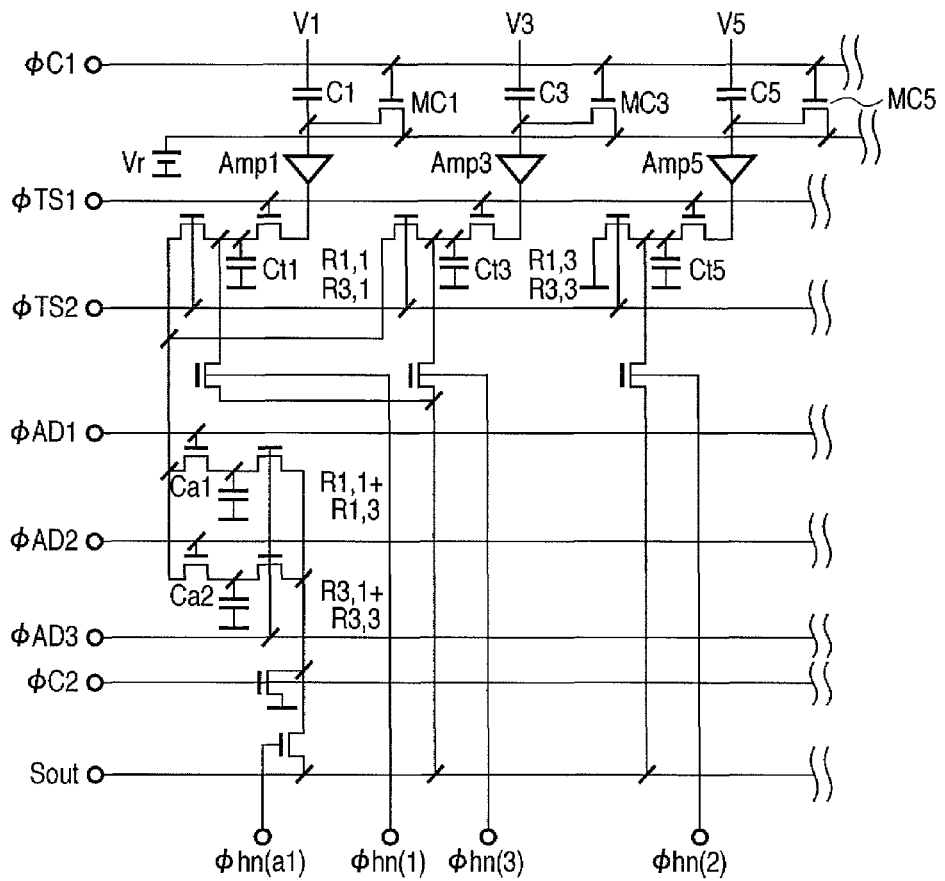
FIG. 18 is a circuit diagram showing part of a readout signal processing circuit for processing pixel signals read out from the image sensing region of a unit pixel amplifier according to the embodiment shown in FIG. 1.

FIG. 18 is a circuit diagram showing part of a readout signal processing circuit for processing pixel signals read out from the image sensing region of a unit pixel amplifier according to the first embodiment shown in FIG. 1. Signal readout from the pixel unit and signal addition will be described with reference to FIG. 18.

An example in which the readout signal processing circuit shown in FIG. 18 adds pixel signals of four homochromatic pixels in three rows×three columns will be described. Referring to FIG. 18, a circuit including capacitances C1, C3, and C5 connected to vertical signal lines V1, V3, and V5, clamp switches MC1, MC3, and MC5, reference voltage source Vr, and amplifiers Amp1, Amp3, and Amp5 is a CDS circuit which removes noise from signal of the pixel units (a description of a CDS operation will be omitted). Signals R1,1 and R1,3 read out from pixels and subjected to CDS are stored in memory capacitances Ct1 and Ct3. These signals are added in a memory capacitance Ca1 of the adding circuit. Similarly, signals R3,1 and R3,3 read out from pixels and subjected to CDS are stored in the memory capacitances Ct1 and Ct3 and added in a memory capacitance Ca2. The sum signals in the memory capacitances Ca1 and Ca2 are output to a horizontal signal line Sout in accordance with scan pulses ($\phi$hn(a1), $\phi$hn(a2), . . . ) from the horizontal scanning circuit. As a result, the four pixels (R1,1, R1,3, R3,1, and R3,3) are added. In a similar manner, pixels are decimated and added between the groups.

In the embodiment shown in FIG. 18, a pixel of a unit pixel amplifier have been described. In the common pixel amplifier MSF', since two vertical pixels are added in the pixel, the memory capacitances Ca1 and Ca2 are unnecessary.

Figure 19:
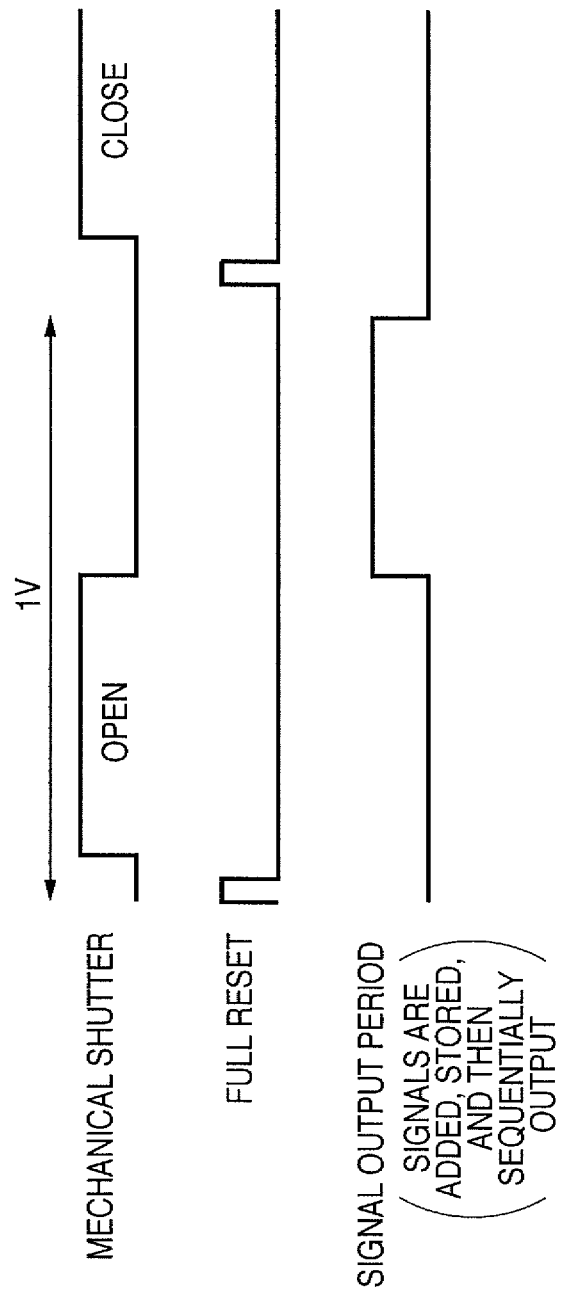
FIG. 19 is an explanatory view in use of a mechanical shutter.

FIG. 19 is a view in use of a mechanical shutter. In this case, all pixels in the image sensing region are reset at once. After the mechanical shutter finishes exposure, an arbitrary adding unit adds the pixel signals. Then, the signals are externally output from a memory 2 in one horizontal scanning period. Use of the mechanical shutter enables obtaining an image by exposing all pixels in the same exposure time.

Figure 20:
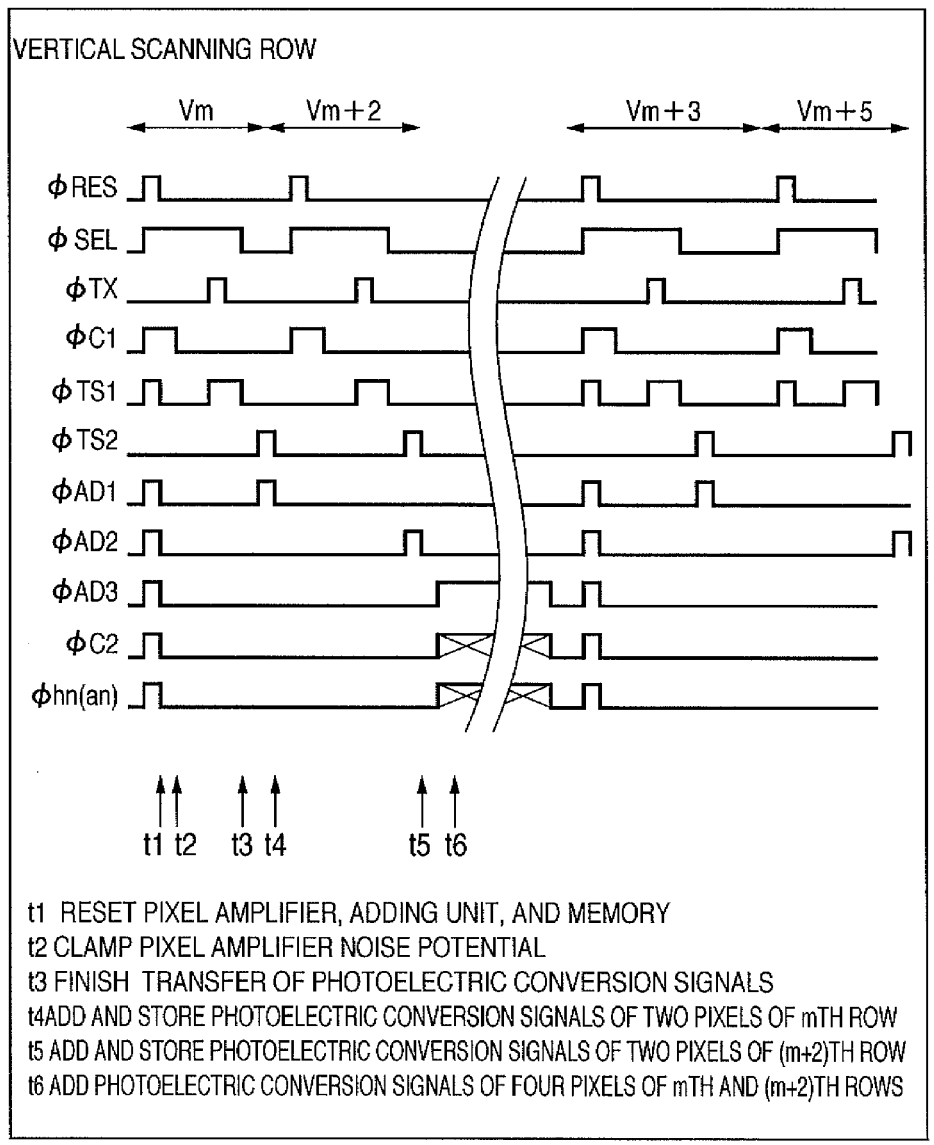
FIG. 20 is a timing chart of pixel signal addition.

This will be explained in accordance with the timing chart in FIG. 20. When an arbitrary exposure period has elapsed, residual charges in the gates of the pixel circuit units are reset under the control of each pulse. At time t1, a pulse $\phi$RES resets the gate portion of the pixel amplifier MSF, pulses $\phi$C1 and $\phi$TS1 reset a memory Ct, and pulses $\phi$AD1 to $\phi$AD3 and $\phi$C2 reset the memory capacitances Ca1 and Ca2. At time t2, a clamp capacitance C clamps common pixel amplifier noise in the OFF state of the pulse $\phi$C1, and charges in the photodiode are input to the clamp capacitances C1, C3, and C5 via the pixel amplifier in accordance with a pulse $\phi$TX.

As a result, CDS removes pixel noise, and the memory temporarily stores the resultant signal via the amplifier Amp.

At time t3, pulses $\phi$SEL and $\phi$TS1 fall, and transfer of photoelectric conversion signals of the pixels is complete. At time t4, the signals in the memory are added in the memory Ca1 in accordance with pulses $\phi$TS2 and $\phi$AD1.

By the same scanning and operation, at time t5, the memory Ca2 stores the pixels signals of the next added rows. At time t6, the signals from the memory capacitance Ca are added in the output signal line Sout and output.

In the above-described 4-pixel adding readout mode, the SN ratio (signal-to-light shot noise ratio) increases to double. Hence, the system controls the amount of exposure light and sets the amount of incident light to about ¼. This indicates that the photoelectric conversion signal in each photodiode decreases to ¼. When the image capturing element is a CCD, the signal charge amount after addition does not change because of the 4-pixel charge addition even when the amount of incident light is ¼. This poses a problem of signal saturation, and the sensitivity and saturation characteristic have tradeoff relationships.

A CMOS sensor of this embodiment adds the average values of signal voltages. For this reason, when the drop of signal level by capacitance division is neglected, the signal level is about ¼ even after addition of four pixel signals. This indicates that signal saturation is strengthened by four times. However, if the signal level is low, the noise of the output amplifier (not shown in FIG. 1) connected to the horizontal output line comes to the fore. To prevent this, in the present invention, in the adding readout mode, the amplification gain of the amplification circuit Amp after CDS is set to about four times that in the progressive scan mode. This reduces the noise of the output amplifier. It is therefore possible to increase the sensitivity by pixel signal addition, increase the readout speed by reducing the number of readout pixels, maintain a wide dynamic range, and achieve a low-power system.

Figure 21:
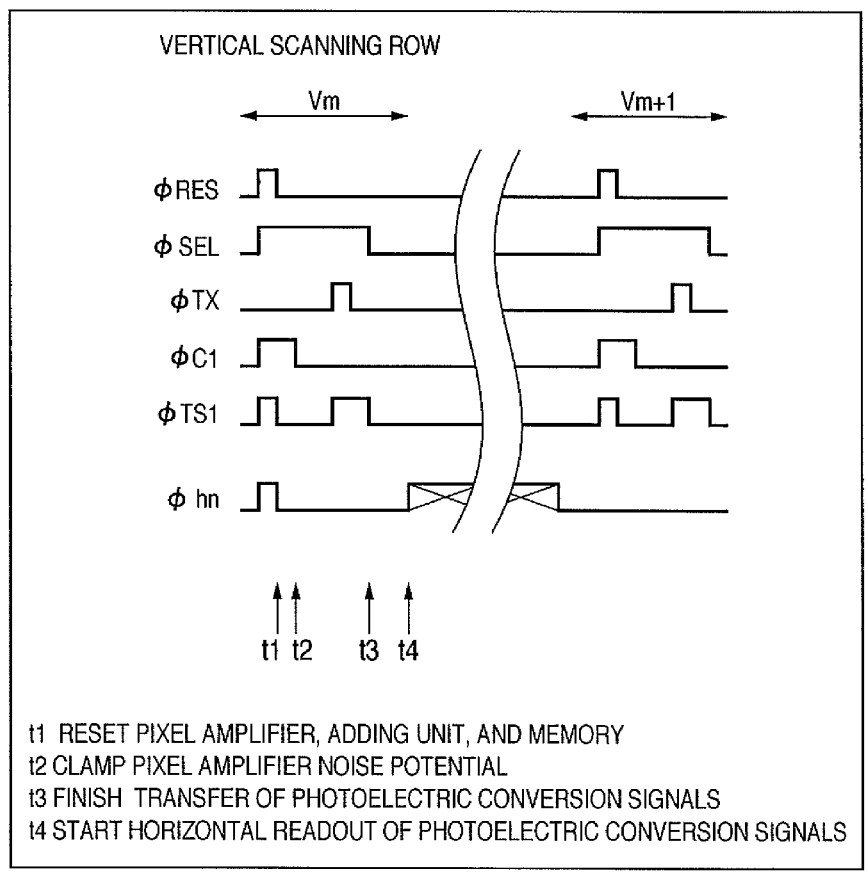
FIG. 21 is a timing chart of readout of all pixel signals.

FIG. 21 is a timing chart of readout of all pixel signals. At time t1, the pixel amplifier, adding unit, and memory are reset. At time t2, the noise potential of the pixel amplifier is clamped. At time t3, transfer of photoelectric conversion signals is ended, and the signals are stored in the memory Ca. From time t4, the signals are output directly from the memory Ca to the horizontal output line Sout.

Figure 22:
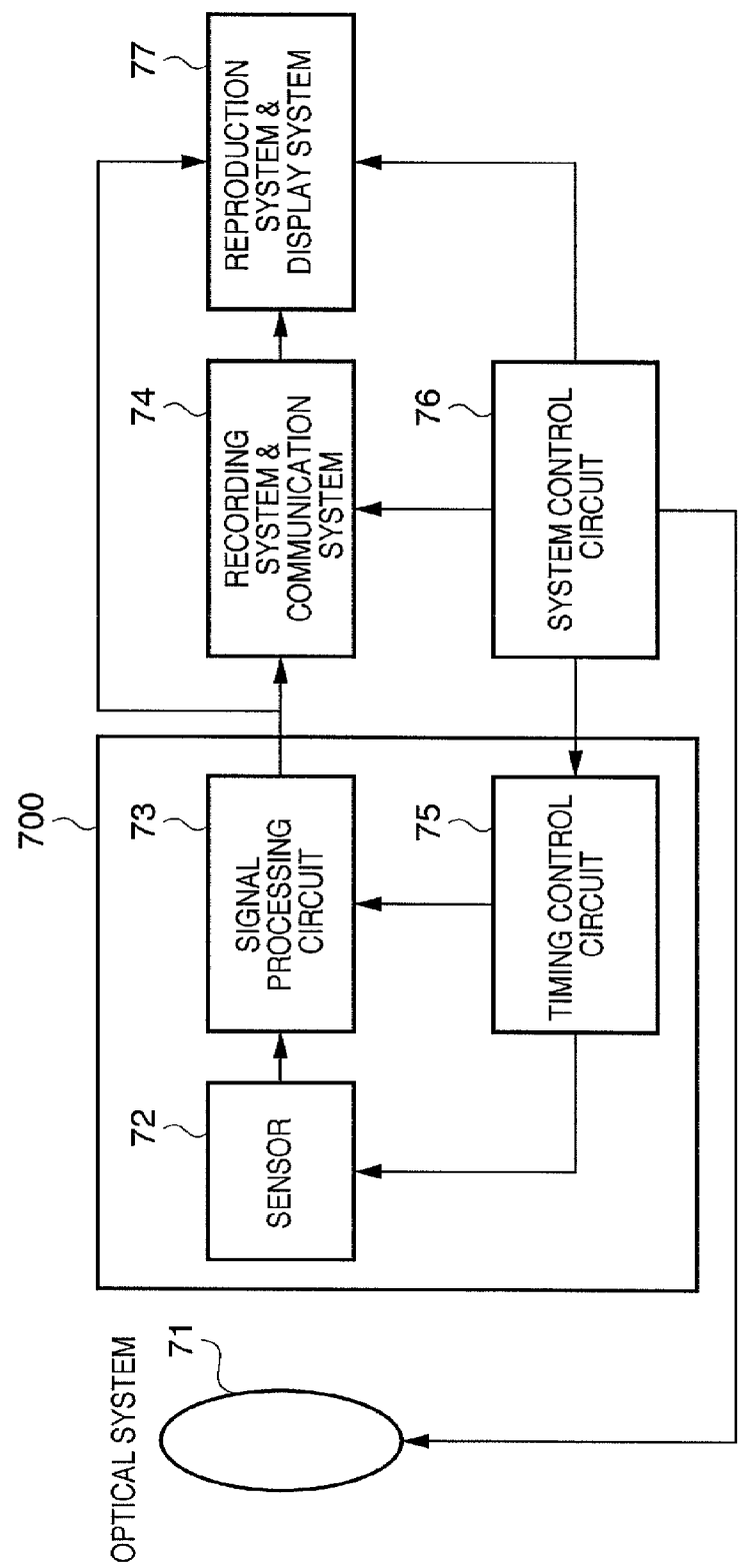
FIG. 22 is a block diagram showing the schematic arrangement of an image capturing system using the image sensing apparatus according to the preferred embodiment of the present invention.

FIG. 22 is a block diagram showing the schematic arrangement of an image capturing system using the image sensing apparatus. The image capturing system comprises an image sensing apparatus 700 including a sensor 72, signal processing circuit 73, and timing control circuit 75. As shown in FIG. 22, object light input via an optical system 71 forms an image on the sensor 72. The pixels arranged on the sensor convert the light information into an electrical signal. The signal processing circuit 73 executes conversion processing of the electrical signal in accordance with a predetermined method. A recording system & communication system 74 records the processed signal using an information recording device or transmits the signal. The recorded or transferred signal is reproduced or displayed by a reproduction system & display system 77. The timing control circuit 75 controls the sensor 72 and signal processing circuit 73. A system control circuit 76 for controlling the entire image capturing system controls the timing control circuit 75, recording system & communication system 74, and reproduction system & display system 77. The timing control circuit 75 selects the progressive scan mode or adding readout mode.

The above-described progressive scan mode and adding readout mode use different horizontal and vertical driving pulses. It is therefore necessary to change the sensor drive timing, resolution processing of the signal processing circuit, and the number of recorded pixels of the recording system between the readout modes. This control is done by the system control circuit 76 in accordance with the readout mode. Additionally, the sensitivity by addition changes between the readout modes. The system control circuit controls the stop (not shown). In high-resolution shooting, the system executes progressive scan in accordance with a control pulse (not shown) from the timing control circuit. In low-resolution shooting, high-speed readout with a high sensitivity or a high image quality free from moiré can be done by executing decimation driving of pixels and adding pixel signals in or between pixel groups.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-097630, filed Apr. 3, 2007 and Japanese Patent Application No. 2007-309334, filed Nov. 29, 2007 which are hereby incorporated by reference herein in their entirety.

What is claimed is:

1. An image sensing apparatus comprising:
a pixel array in which a plurality of first-color pixels and a plurality of second-color pixels are alternately arranged in a first direction, wherein the second-color pixels have a color different from that of the first-color pixels; and
a plurality of amplifiers,
wherein signals of a first set of first-color pixels of the plurality of first-color pixels are transferred to an amplifier, of the plurality of amplifiers, corresponding to the first set of first-color pixels, so as to add the signals of the first set of first-color pixels,
wherein signals of a second set of second-color pixels of the plurality of second-color pixels are transferred to an amplifier, of the plurality of amplifiers, corresponding to the second set of second-color pixels, so as to add the signals of the second set of second-color pixels,
wherein signals of a third set of first-color pixels of the plurality of first-color pixels are transferred to an amplifier, of the plurality of amplifiers, corresponding to the third set of first-color pixels, so as to add the signals of the third set of first-color pixels,
wherein a region in which the second set of second-color pixels whose signals are transferred to the amplifier corresponding to the second set of second-color pixels are arranged partially overlaps with a region in which the first set of first-color pixels whose signals are transferred to the amplifier corresponding to the first set of first-color pixels are arranged and a region in which the third set of first-color pixels whose signals are transferred to the amplifier corresponding to the third set of first-color pixels are arranged,
wherein first centers of gravity and second centers of gravity are alternately arranged in the first direction, and centers of gravity consisting of the first centers of gravity and the second centers of gravity are arranged at equal pitches, wherein each of the first centers of gravity is one of a center of gravity of the first set of first-color pixels whose signals are transferred to the amplifier corresponding to the first set of first-color pixels and a center of gravity of the third set of first-color pixels whose signals are transferred to the amplifier corresponding to the third set of first-color pixels, and the second centers of gravity include a center of gravity of the second set of second-color pixels whose signals are transferred to the amplifier corresponding to the second set of second-color pixels.

2. The image sensing apparatus according to claim 1, wherein in the region in which the first set of first-color pixels whose signals are transferred to the amplifier corresponding to the first set of first-color pixels are arranged, no first-color pixels are decimated, wherein in the region in which the second set of second-color pixels whose signals are transferred to the amplifier corresponding to the second set of second-color pixels are arranged, no second-color pixels are decimated, and wherein in the region in which the third set of first-color pixels whose signals are transferred to the amplifier corresponding to the third set of first-color pixels are arranged, no first-color pixels are decimated.

3. The image sensing apparatus according to claim 1, wherein a signal which is generated by adding the signals of the first-color pixels is further added to a signal which is generated by adding other signals of the first-color pixels, and a signal which is generated by adding the signals of the second-color pixels is further added to a signal which is generated by adding other signals of the second-color pixels.

4. The image sensing apparatus according to claim 1, wherein signals of at least three first-color pixels are added, and wherein signals of at least three second-color pixels are added.

* * * * *